United States Patent [19]
Pfister et al.

[11] Patent Number: 6,022,601
[45] Date of Patent: Feb. 8, 2000

[54] PENETRATION-RESISTANT COMPOSITION

[75] Inventors: Friedrich V. Pfister, Geneva, Switzerland; Antoine Schelling, Midlothian, Va.

[73] Assignee: E. I. du Pont de Nemours and Company, Wilmington, Del.

[21] Appl. No.: 08/752,472

[22] Filed: Nov. 19, 1996

Related U.S. Application Data

[60] Provisional application No. 60/006,974, Nov. 20, 1995.

[51] Int. Cl.$^7$ .......................... B29D 22/00; B29D 23/00; B32B 1/08; B32B 7/00

[52] U.S. Cl. .................. 428/36.1; 428/221; 428/245; 428/99; 428/137; 428/102; 428/105; 428/109; 442/134; 442/135

[58] Field of Search ................. 428/63, 99, 100, 428/109, 114, 131, 137, 138, 166, 172, 175, 179, 911, 912, 495, 518, 364, 394, 902, 245, 36.1, 142, 152, 247, 400, 192, 397–399, 105, 113, 43; 156/292, 166, 181; 442/134

[56] References Cited

U.S. PATENT DOCUMENTS

| | | | |
|---|---|---|---|
| 3,444,033 | 5/1969 | King .......................................... 161/38 |
| 3,577,306 | 5/1971 | Baker et al. ............................... 161/90 |
| 4,623,574 | 11/1986 | Harpell et al. ........................... 428/113 |
| 4,650,710 | 3/1987 | Harpell et al. ........................... 428/263 |
| 4,737,401 | 4/1988 | Harpell et al. ........................... 428/252 |
| 4,737,402 | 4/1988 | Harpell et al. ........................... 428/252 |
| 5,124,195 | 6/1992 | Harpell et al. ........................... 428/245 |
| 5,378,426 | 1/1995 | Harpell et al. ........................... 428/109 |
| 5,405,673 | 4/1995 | Seibert ...................................... 428/137 |
| 5,466,503 | 11/1995 | Dischler ..................................... 428/43 |
| 5,489,476 | 2/1996 | Dischler ................................... 428/400 |
| 5,547,536 | 8/1996 | Park .......................................... 156/292 |
| 5,578,374 | 11/1996 | Dunbar et al. ........................... 428/364 |
| 5,628,946 | 5/1997 | Ward et al. .............................. 264/120 |
| 5,635,288 | 6/1997 | Park .......................................... 428/105 |
| 5,660,913 | 8/1997 | Coppage, Jr. ............................ 428/102 |

FOREIGN PATENT DOCUMENTS

| | | |
|---|---|---|
| 26 42 882 | 9/1976 | Germany . |
| 1 578640 | 3/1977 | Germany ........................... F41H 5/04 |
| WO 89/01124 | 2/1989 | WIPO ................................ F41H 5/04 |
| WO 91/08895 | 6/1991 | WIPO . |
| WO 93/00564 | 1/1993 | WIPO ................................ F41H 5/04 |

*Primary Examiner*—Avis M. Davenport

[57] ABSTRACT

The invention relates to a penetration-resistant composition comprising at least one layer in which fibers having a tenacity of at least 900 MPa (7 g/denier) according to ASTM D-885 are present and which layer is bonded to a polymeric continuum having a flexural modulus of 42 to 1,000 MPa according to ASTM D-790, a tensile strength at break of at least 10 MPa according to ASTM D-638 and an elongation to break of at least 100% according to ASTM D-638.

The invention furthermore relates to armour comprising multiple layers of such a composition and to a process for manufacturing such a composition.

10 Claims, No Drawings

PENETRATION-RESISTANT COMPOSITION

This application claims the benefit of U.S. Provisional Application No. 60/006,974, filed Nov. 20, 1995.

BACKGROUND OF THE INVENTION

1. Field of the Invention

The invention relates to a penetration-resistant composition, armour comprising at least one layer of such a composition, and to a process for manufacturing such a composition.

2. Description of Prior Art

It is known to use high tenacity fibers such as polyaramid fibers in multi-layered structures to provide ballistic protection in body armour. It is furthermore known to include one or more impact-absorbing layers in such structures in order to increase the efficiency of the ballistic protection by slowing down further the ballistic projectiles which penetrate successive layers of the structure.

A significant disadvantage of such known ballistic protection structures is that the stab resistance provided by such structures is usually relatively low because knives and pointed objects will push the high tenacity fibers aside and penetrate the impact-absorbing layers, if any, which are not usually designed to withstand penetration and sharp objects when ballistic protection is the main aim.

This deficiency in protection can be overcome by structures providing both ballistic and stab protection by including relatively heavy penetration-resistant layers made, for example, from ceramic material, steel, titanium or aluminium in the structure, usually facing the outside, in front of the high-tenacity fiber layer(s). However, due to the relatively high specific weight (expressed in kg/m$^2$) and stiffness of such multi-layer structures, the comfort of wearing body armour made up of these structures is rather unsatisfactory.

It would be of substantial interest to manufacturers and users of armour, alike, if penetration-resistant compositions would be available which would provide excellent protection against ballistic projectiles as well as sharp and/or pointed objects, such as knives and spikes, while at the same time providing a wearer with a comfortable alternative to previously described heavy multilayer structures.

Surprisingly, it has now been found that penetration-resistant compositions which show both ballistic and stab resistance can be provided by bonding at least one high-tenacity fiber layer with a flexible strong polymer layer having specific properties as defined hereinafter.

SUMMARY OF THE INVENTION

The present invention relates to a penetration-resistant composition comprising at least one layer in which yarns of fibers having a tenacity of at least 900 MPa (7 g/denier) according to ASTM D-885 are present and which layer is bonded to a polymeric continuum having a flexural modulus of 42 to 1,000 MPa according to ASTM D-790, a tensile strength at break of at least 10 MPa according to ASTM D-638 and an elongation to break of at least 100% according to ASTM D-638.

DETAILED DESCRIPTION

The combination of fibers and polymer in the form of fibers bonded to a polymer layer or impregnation of a fiber layer with a polymer in order to make use of both the properties of the fibers and the polymeric continuum or just to hold the fibers together in a fixed structure has been known for a long time. More specifically, fibrous layers in the form of woven or non-woven fabrics have been bonded to polymeric resins in order to provide (parts of) anti-ballistic structures. However, the polymer resin used in such structures generally does not, by itself, contribute significantly to the ballistic resistance but holds the fibers in place; separate layers of more penetration-resistant polymeric material such as polycarbonate or metal sheets are then added to form an anti-ballistic pack which has a relatively high specific weight.

As defined in the Summary hereinabove, the present invention overcomes the disadvantage of known penetration-resistant compositions by bonding "strong" fibers to a polymeric continuum with relatively high flexural modulus, tensile strength and elongation properties.

Various types of fibers can be applied in the composition according to the invention such as fibers comprising a polyolefin, for example, polyethylene, polyimide, polyester or polyaramid, provided that the tenacity of the fibers is at least 900 MPa according to ASTM D-885, which equals approximately 7 grams/denier. Preferably, the tenacity of the fibers is at least 2000 MPa according to ASTM D-885 in order to provide superior penetration-resistance against bullets and knives and other sharp and/or pointed objects impacting the composition according to the invention.

Polyaramid fibers are preferred for many applications according to the invention because they can have the required tenacity, even surpassing the preferred 2000 MPa limit and, in addition have the chemical resistance, which together with a chemical resistant bonding polymer, results in a penetration-resistant composition which is also chemically very resistant thus rendering it suitable for application under the most difficult circumstances.

The fibers can be present in the composition in many forms, preferably, as a knitted fabric, a woven fabric, as a uniweave structure, unidirectional structure or multi-directional sheet (for example, having fibers crossing over at an angle between 20 and 90 degrees), as a non-woven layer (for example, felt) or even as single fibers. By uniweave structure is meant a woven structure in which at least 80 weight percent of fibers in the structure are aligned in the same direction, making up the warp or the fill of the structure. By unidirectional structure is meant a structure in which all fibers in the structure are aligned in the same direction.

For reasons of manufacturing efficiency, availability and geometric strength (well-defined, stable, structure) a woven fabric of high tenacity fibers is preferred for many compositions according to the invention. The fabric can suitably be a plain weave made up typically from 42×42, 28×28, 14×14, or 6.7×6.7 ends/cm, although other woven structures can equally well be used, depending on the specific application. The specific weight of such fabrics is generally from 0.02 to 0.5 kg/m$^2$ and preferably from 0.05 to 0.5 kg/m$^2$ and more preferably 0.08 to 0.3 kg/m$^2$ in order to obtain a balance between penetration resistance and specific weight, in particular when multiple layers of such fabrics are applied in a composition according to the invention. If the specific weight is below 0.02 kg/m$^2$, the ballistic resistance of the fabric, even when made from polyaramid fibers, is generally unacceptable whereas if the specific weight is above 0.5 kg/m$^2$, the use of a plurality of fabric layers becomes impractical, due to weight constraints.

Individual filaments of yarns used in the composition according to the invention have a denier (defined as the weight in grams of 9000 meters of fiber) from 0.1 to 1,000, preferably from 0.2 to 200; and the yarns have a denier of from 10 to 3500.

For some applications, depending on the fabric weight/ballistic performance ratio, a yarn with a denier from 1000 to 3000 is used for less demanding applications, while for other applications, such as those requiring high performance/low specific weight, a yarn with a denier from 10 to 1000, and more particularly from 50 to 1000 is preferred. In many cases, a denier range from 10 to 3000 for the yarns is excellent.

The fibers can be present in uncoated- or coated- or otherwise pretreated (for example, pre-stretched or heat-treated) form in the composition. In case polyaramid fiber is used, it is generally not necessary to coat or otherwise pre-treat the fiber other than arranging it in the appropriate woven or non-woven layer; however, in some cases a coating might be applied to the fibers in order to increase bonding of the fibers to the polymeric continuum.

A wide variety of polymers can be used in the polymeric continuum according to the invention. Preferably a thermoplastic polymer is used for manufacturing reasons as described hereinafter and because various thermoplastic polymers can be obtained commercially which have the required tensile strength and elongation. Suitable polymers include specific polyethylenes, polyimides, polyether etherketones, ionomeric resins, phenolic-modified resins, polyesters, and the like.

The thermoplastic polymer is preferably an ionomeric resin, more preferably an ionomeric resin containing cations selected from the group consisting of lithium, sodium and zinc, and, in particular, from 0.1 to 3% by weight of such cations.

The thermoplastic polymer can, also, be a phenolic modified resin, in particular a phenolic-polyvinylbutyral resin.

When used in a penetration-resistant composition according to the invention which is in particular also stab-resistant, the polymeric continuum should preferably have a tensile strength at break of at least 20 MPa and an elongation to break of at least 200%, more preferably at least 300%, both according to ASTM D-638.

The flexibility of the polymeric layer in the composition is an important factor for both the puncture-resistance of the composition and the wearing comfort of body armour made up of one or more layers of the composition. The flexural modulus of the polymer should be between 42 and 1000 MPa, according to ASTM D-790, in particular between 50 and 800 MPa. A flexural modulus higher than 1000 MPa indicates a polymer that is too stiff to effectively withstand puncture or be worn comfortably as body armour, whereas a flexural modulus of less than 42 MPa indicates a material which is too flexible to provide any effective stiffness to the composition for anti-stab purposes. An additional advantage of body armour comprising such a polymer is the reduced backforce deformation attained when a bullet hits the body armour.

Another significant property of the polymer layer in the present composition is the a real density thereof (expressed in kg/m$^2$). A low a real density is important for ease of wear when the composition is used for body armour and for ease of handling and efficient engineering with the aim of weight reduction for any other objects in which the composition is present.

The density of the polymer in the continuum is preferably less than 2.5g/cc; and, more preferably, less than 1.5g/cc. Ionomeric polymer is particularly preferred in this respect if the density is less than 1 g/cc.

The polymeric continuum can be suitably applied as a layer in the composition by being bonded at one side or at both sides to a fiber-containing layer, depending on the application; and, in more practical terms, on the availability of the appropriate manufacturing process. In a preferred embodiment of the invention, the fiber-containing layer is embedded in the polymeric continuum in order to immobilize the fibers, resulting in an extremely strong composition. The resulting polymer-and-fiber layers can be bonded in a batch or continuous process by any means known in the art, such as calendering, extrusion coating, gluing, impregnation, thermally bonding, other forms of laminating layers of two different materials, or even in-situ polymerization thus forming a polymer continuum with the fibers. A preferred method of bonding is thermal bonding, such as molding.

The present invention furthermore relates to a process for manufacturing a penetration-resistant composition as described hereinbefore by bonding a polymer layer having a thickness of 10–300 micrometers to a layer containing yarns from 10–3500 denier, by pressing the different layers together at a pressure of 2–100 bar, a temperature above the melting point of the polymer and preferably up to 150° C. higher than the melting point, for a period of 0.01–30 min.

For an efficient manufacturing process according to the invention, it is important that a polymer be selected having a melting point which is relatively low and a convenient temperature range within which it has a sufficiently low viscosity to form good bond with the fiber-containing-layer. For these reasons, the molecular weight average of the polymer should not be too high, whereas an the other hand the molecular weight average should be sufficiently high to provide adequate strength to the composition and to form and maintain a polymeric continuum at elevated temperatures. Preferably the molecular weight average of the polymer in the material is from 5,000 to 500,000 in order to allow a continuous lamination process to proceed efficiently. Moreover, both the fiber-containing layer(s) and the polymer layer(s) can be processed into armour from rolls like a normal fabric, as opposed to known discontinuous manufacturing methods for armour, in which, usually metallic, platelets are interconnected by means of rivets or other connecting means or glue.

A further significant advantage of the composition and process according to the invention is the ability to form (for example, by molding) the composition into any continuous shape, in particular a three-dimensional body shape when used for body armour or protective apparel. Such cannot be achieved using commercial discontinuous armour containing plates. Because the present material can be used in the form of continuous sheets, the protection obtained is better than with the use of discontinuous material.

The optimal thickness of the polymer layer(s) used, both in the composition and in the process according to the invention, depends on the number of fiber-containing layers bonded to one polymer layer. If only one side of the polymer layer is bonded to a fiber-containing layer, then the thickness of the polymer layer is preferably from 10 to 200 um. If both sides of the polymer layer are bonded to a fiber-containing layer, then the thickness of the polymer layer should preferably be from 20 to 400 $\mu$m and more preferably from 100 to 300 $\mu$m. A primary reason for this preferred difference in thickness of the polymer layer is that sufficient polymer should be present in relation to the fiber material to be bonded therewith in order to form an interpenetrating network of fiber substantially surrounded by polymer.

In the resulting composition, therefore, the polymer layer (s) which is (are) used in manufacturing the composition may be present no longer in the form of one or more distinct layers, but in the form of a polymeric continuum surrounding the fabric layer(s).

The composition according to the invention preferably has a penetration resistance of at least 100 N/(kg/m²) according to ASTM F-1342-91, in particular of at least 200 N/(kg/m²).

The invention also relates to armour such as body armour (in particular stab-resistant vests) or fixed or mobile armour such as panels, blankets or curtains comprising multiple layers of a penetration-resistant composition as described hereinbefore.

The multiple layers can be arranged randomly or at defined angles with respect to the main direction of the fibers in a single layer, depending on the application.

The penetration-resistant composition according to the invention can furthermore be used for protective apparel such as cut and puncture-resistant gloves, sleeves, shoes and other workwear and sportswear, also for packaging.

The invention is illustrated by the following Examples:

EXAMPLE 1

Fiber layers are used consisting of woven polyaramid fiber of 200 denier, containing 28×28 ends/cm and having a specific weight of 0.13 kg/m². The fibers have a tenacity of 3,400 MPa according to ASTM D-885. An ionomeric polyethylene-based polymer layer containing 1.44% by weight of sodium ions is used having a tensile strength at break of 29 MPa according to ASTM D-638, an elongation to break of 440% according to ASTM D-638 and a thickness of 150 μm. The flexural modulus of the polymer is 220 MPa according to ASTM D-790 and the density is 940 kg/m³. The polymer layer is laminated, in this case by moulding, with fiber layers at both sides, by pressing the layers together at a pressure of 10 bar, a temperature of 120° C. (above the melting point of the polymer) during a period of 15 min.

The resulting composition has a penetration resistance of 400 N/(kg/m²) according to ASTM F-1342-91.

COMPARATIVE EXAMPLE 2

An armour structure is assembled comprising 45 layers of woven polyaramid fibers (style 365) of 840 denier, containing 11.7×11.7 ends/cm and having a specific weight of 0.220 kg/m². The fibers have a tenacity of 3492 MPa according to ASTM D-885. The body armour structure containing no polymer layer or continuum does not meet the anti-stab requirement of less than 20 mm penetration at an impact energy of 25 J when tested in accordance with European Norm: CEN/TC 162/WG 5 N 479.

COMPARATIVE EXAMPLE 3

An armour structure comprising, exclusively, layers of ionomeric polymer as defined in Example 1 and having a similar specific weight as the polyaramid fiber structure described in Comparative Example 2 does not meet the same antistab requirement either, even though each polymer layer having a thickness of 150 μm has a tensile strength at break of 29 MPa and an elongation to break of 440%, both according to ASTM D-638, a flexural modulus of 220 MPa according to ASTM D-790 and a density of 940 kg/m³.

EXAMPLE 4

An armour structure is made up of penetration-resistant composite layers each comprising one ionomeric polymer layer as described in Comparative Example 3 bonded at both sides to a polyaramid fiber layer as described in Comparative Example 2 by a laminating process as described in Example 1; the resulting structure has a similar specific weight as those described in Comparative Examples 2 and 3.

However, this hybrid body armour structure according to the present invention meets the anti-stab requirement as described in Comparative Example 2.

COMPARATIVE EXAMPLE 5

An armour structure made up entirely of woven polyaramid fiber layers, having the same characteristics as the structure described in Comparative Example 2 has a specific weight of 10.8 kg/m². It just meets the antistab requirement at 20 mm penetration at an impact energy of 25 J according to CEN/TC 162/WG 5 N 479. However, this structure is not a penetration resistant composition according to the present invention because it contains no polymeric continuum.

EXAMPLE 6

An armour structure comprising penetration-resistant composite layers as described in Example 4 and having a specific weight of 7.5 kg/m² far exceeds the anti-stab requirement at only 13 mm penetration at an energy of 25 J according to CEN/TC 162/WG 5 N 479. Thus, when comparing this structure with that of Comparative Example 5 the improvement obtained in stab resistance is 35% at a specific weight that is 25% lower for this structure.

COMPARATIVE EXAMPLE 7

An armour structure comprising exclusively four layers of woven polyaramid fiber having a specific weight of 0.120 kg/m² containing 28×28 ends/cm with fibers of 200 denier having a tenacity of 3492 MPa according to ASTM D-885.

The puncture resistance of the structure is 16.9 kg when tested according to ASTM F-1342-91.

EXAMPLE 8

An armour structure comprises ionomeric polymer layers as described in Comparative Example 3 bonded at both sides to polyaramid fiber layers as described in Comparative Example 7 with a laminating process according to Example 1. The resulting armour structure has a similar specific weight as the armour structure described in Comparative Example 7 but the former structure has a puncture resistance of 22.4 kg when tested according to ASTM F-1342-91; this is an improvement of 32.5%.

EXAMPLE 9

An armour structure comprises 38 layers of composite comprising a fabric of woven polyaramid fibers of 840 denier (sold by E. I. du Pont de Nemours and Company under the trademark KEVLAR®) 11×11 ends/cm laminated with ionomeric polymer according to a laminating process as described in Example 1; however, the lamination of the ionomeric polymer on the fabric of KEVLAR® polyaramid fibers is now carried out near the melting point of the polymer at a temperature of 96° C. The resulting armour structure shows a penetration of 19.5 mm in the backing material at an impact energy of 25 J according to CEN/TC 162/WG 5 N 479.

EXAMPLE 10

An armour structure comprising the same number (38) of ionomeric polymer layers and fabric layers of KEVLAR® polyaramid fibers as described in Example 9 is laminated at a temperature of 146° C. which is 50° C. above the melting point of the ionomeric polymer. The resulting structure has a blade penetration of 11.2 mm in the backing material; at the same penetration of 19.5 mm as described in Example 9, the armour structure will absorb at least 32 J according to CEN/TC 162/WG 5 N 479, which is 28% more energy absorption than the armour structure of Example 9 at equal specific weight (kg per square meter) of the structure.

What is claimed is:

1. Penetration-resistant composition comprising at least one layer in which yarns of fibers having a tenacity of at least 900 MPa (7 g/denier) according to ASTM D-885 are present as an interpenetrating network of fibers substantially surrounded by an ionomeric resin having a flexural modulus of 42 to 1000 MPa according to ASTM D-790, a tensile strength at break of at least 10 MPa according to ASTM D-638 and an elongation to break of at least 100% according to ASTM D-638.

2. Composition according to claim 1 in which the fibers are polyaramid.

3. Composition according to claim 1 in which the fibers are present as a woven fabric.

4. Composition according to claim 1 in which fibers are present as a unidirectional structure.

5. Compsition according to claim 1 in which fibers are present as a uniweave structure.

6. Composition according to claim 1 in which fibers are present as a multi-directional sheet.

7. Composition according to claim 1 in which the yarns are from 10 to 3500 denier.

8. Composition according to claim 1 which has a penetration resistance of at least 100 N/(kg/m$^2$) according to ASTM F-1342-91.

9. Armour comprising multiple layers of a composition according to claim 1.

10. Process for manufacturing a penetration-resistant composition having an interpenetrating network of fibers substantially surrounded by ionomeric resin comprising the steps of pressing a layer in which fibers in yarns from 10–3500 denier having a tenacity of at least 900 MPa (7 g/denier) according to ASTM D-885 are present, into a layer of ionomeric resin having a flexural modulus of 42 to 1000 MPa according to ASTM D-790, a tensile strength at break of at least 10 MPa according to ASTM D-638, an elongation to break of at least 100% according to ASTM D-638, and a thickness of 10–300 micrometers at a pressure of 2–100 bar and a temperature above the melting point of the ionomeric resin for a period of 0.01–30 min.

* * * * *